(12) United States Patent
Bong

(10) Patent No.: US 8,816,238 B2
(45) Date of Patent: Aug. 26, 2014

(54) ELECTROSLAG WELDING WITH VARIABLE BALANCE, CONSTANT POTENTIAL, ALTERNATING CURRENT, SQUARE WAVE WELDING POWER SUPPLY

(76) Inventor: William L. Bong, Walnut Creek, CA (US)

( * ) Notice: Subject to any disclaimer, the term of this patent is extended or adjusted under 35 U.S.C. 154(b) by 679 days.

(21) Appl. No.: 12/787,159

(22) Filed: May 25, 2010

(65) Prior Publication Data

US 2010/0308019 A1 Dec. 9, 2010

Related U.S. Application Data

(60) Provisional application No. 61/183,715, filed on Jun. 3, 2009.

(51) Int. Cl.
*B23K 25/00* (2006.01)

(52) U.S. Cl.
USPC ......................................................... 219/73.1

(58) Field of Classification Search
CPC .. B23K 25/00; B23K 11/046; B23K 2201/26; B23K 2201/28
USPC ........ 219/73.1, 130.1, 130.5, 130.51, 137 PS, 219/137 R
See application file for complete search history.

(56) References Cited

U.S. PATENT DOCUMENTS

| | | | | |
|---|---|---|---|---|
| 4,038,515 A * | 7/1977 | Risberg | ..................... | 219/130.33 |
| 4,506,130 A * | 3/1985 | Oszlar et al. | ................. | 219/73.1 |
| 5,753,888 A * | 5/1998 | Eldridge | .................... | 219/130.4 |
| 6,278,081 B1* | 8/2001 | Reynolds | ................. | 219/130.31 |
| 2001/0045420 A1* | 11/2001 | Bong et al. | ................. | 219/125.1 |
| 2005/0098542 A1* | 5/2005 | Bong et al. | ................... | 219/73.1 |

* cited by examiner

*Primary Examiner* — Duy T Nguyen
(74) *Attorney, Agent, or Firm* — Charles L. Thoeming

(57) ABSTRACT

A DC balanced square wave power source, controlled in a constant voltage mode, for ESW and ESW-NG welding systems and methods can be matched with variable speed wire electrode feeders, multiple guide tubes, articulated air-cooled cooper welding shoes, and multiple pass ESW welding systems, thus gaining the following advantages, namely, controlling weld bead shape, reducing base metal dilution, reducing total heat input into the parent material, and reduction or elimination of any DC magnetic field in the weld cavity.

18 Claims, 4 Drawing Sheets

HEAT INPUT CALCULATIONS FOR MULTI-PASS ELECTROSLAG WELDING USING CONSTANT VOLTAGE SQUARE WAVE AC WELDING POWER SUPPLY

| Plate Thickness (Inches) | Number of Passes | TYPE Guide Tube | Number of Guide Tubes | Number of Wires | Welding Volts | Welding Amperage | Vertical Rate of Rise (Inches) | Heat Input KJ / in | NOTES |
|---|---|---|---|---|---|---|---|---|---|
| 3 | 1 | 2 1/2 | 1 | 2 | 39 | 1,450 | 1.5 | 2,262 | |
| 3 | 2 | 1 1/4 | 1 | 2 | 34 | 950 | 2 | 969 | 1 |
| 6 | 1 | 2 1/2 | 2 | 4 | 39 | 1,600 | 0.9 | 4,160 | |
| 6 | 5 | 1 1/4 | 1 | 2 | 34 | 950 | 2 | 969 | 1 |
| 9 | 1 | 2 1/2 | 3 | 6 | 39 | 2,600 | 0.5 | 12,168 | |
| 9 | 7 | 1 1/4 | 1 | 2 | 34 | 950 | 2 | 969 | 1 |

NOTES:

1. ALL MULTI-PASS WELDING PARAMETERS ARE THE SAME THUS THE SAME HEAT INPUT

FIGURE 7

ELECTROSLAG WELDING WITH VARIABLE BALANCE, CONSTANT POTENTIAL, ALTERNATING CURRENT, SQUARE WAVE WELDING POWER SUPPLY

CROSS-REFERENCES TO RELATED APPLICATIONS

This United States non-provisional patent application is based upon and claims the filing date of U.S. provisional patent application Ser. No. 61/183,715 filed Jun. 3, 2009.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to welding. More particularly, the invention is related to improving Electroslag welding and Narrow Gap Electroslag welding applications using at least one variable balance, constant potential, alternating current square wave (hereinafter "VB/CP/AC Square Wave") welding power supply.

BACKGROUND OF THE INVENTION

Electroslag welding ("ESW") and Narrow Gap Electroslag welding ("ESW-NG") are enjoying resurgence in popularity in high-rise and medium-rise steel buildings now that demonstrable ESW and ESW-NG systems and methods for stiffener welding, column splicing, beam-to-column connections, and doubler plate moment connections have been developed and used. Principal considerations for use of ESW and ESW-NG are the significant cost savings in labor and materials.

Direct current ("DC") welding power supplies have often been used as the standard power source for ESW and ESW-NG welding applications. The original ESW and ESW-NG welding applications utilized constant current (drooping Amp/Volt output curve) power sources without much success. It was not long before constant potential (also referred to as "constant voltage") DC welding power sources were introduced to the process. Constant voltage power supplies set the voltage to be constant during the welding operation constant voltage welding power supplies use variable wire feed speed wire-feeders to adjust the load (or current draw) on the power supply. Constant voltage power supplies have a flat Amp/Volt output curve. When these power supplies are used for ESW and ESW-NG welding, they are generally connected electrode positive ("DCEP"—also referred to as DC reverse polarity). DC power supplies with electrode negative ("DCEN"—also referred to as DC straight polarity) are rarely used for the ESW and ESW-NG process because of poor arc starting and poor welding characteristics.

Ferrous materials, most commonly steel, can be easily magnetized by passing a DC welding current through the welding joint. Because of the magnetic properties of ferrous materials, high current DC welding is often not satisfactory. A magnetic field is generated by the DC arc because the current only flows in one direction. The magnetic field creates an electromagnet out of the material being welded. The electrical field surrounding the arc and the fields associated with the ground currents react with each other in an unpredictable manner. In submerged arc welding (SAW) this is often referred to as "arc-wander" or, "arc-blow". When used with the ESW and ESW-NG welding process, this effect is most objectionable where erratic pull on the molten weld puddle, or the consumable guide tube, can disturb the proper formation and placement of the weld puddle. Welding with a DC power supply can easily create this strong magnetic deflection because DC current only flows in one direction. This unidirectional current flow magnetizes the parent material and results in pulling the molten puddle or the consumable guide tube to one side or the other, depending on the direction of the magnetic field.

To eliminate the problems created by welding in a strong magnet field, users generally revert to alternating current ("AC") power. However the constant current AC sine wave AC does not perform well with the ESW and ESW-NG welding process. A constant current AC transformer has a very steep slope, see e.g. FIG. 5. Since it is constant current, the operator can only set the current on the power supply at a constant level during the welding operation, and not the voltage. This makes control of penetration into the parent material extremely difficult, if not impossible. A constant current type power source often causes arc starting to "stumble" and extinguish, thus failing to re-ignite. This poor starting condition exists because the AC sine wave exhibits a slow "crossover" where the voltage is very low (or zero) at the rate of 120 times per second. It is during the set-times that the arc goes out, and then the wire strikes the puddle again to begin re-ignition. This creates a very unstable arc condition and it causes many "arc start" failures when trying to get the ESW and ESW-NG weld puddle established.

Constant current AC power supplies (often referred to as "drooper" power supplies) are typically 80 volts open circuit and designed with transformers of high leakage construction. They are basically constant current power sources with the welding voltage established by the load, not by the power source. The load on the power supply is created by the diameter, the speed, and the number of welding wires. To use such a current source with the submerged arc process welding requires employment of a "voltage-following" wire feeder. The ESW and ESW-NG process only uses a welding arc until the molten electroslag welding puddle is established, then the arc is extinguished. After the puddle is formed, the arc is extinguished and there no longer is any arc to control the arc voltage. Welding stability with this type of AC welding power supply is difficult to obtain and hold. Current, voltage, and wire feed rate all interact with each other in an unpredictable manner, and the system is thus not stable and self-regulating. Moreover, starting current is very limited with constant current (drooper) AC power sources resulting in arc starts of marginal quality.

Square wave arc welding power supplies are known in the prior art. One example is shown in U.S. Pat. No. 3,364,334 to Sato. The Sato patent shows a diode bridge added in series with the AC line, and an inductor is connected across the DC terminals of the bridge. In this arrangement, the bridge is not the control element, and the welding current control must be provided on the AC line. In addition, the diodes of the bridge form a freewheeling path at all times.

In U.S. Pat. No. 4,038,515 to Risberg, the diodes and the bridge are replaced by thyristors. The actual welding current is compared with the desired weld current setting, and a firing control circuit responds to the resulting error signal to fire the Thyristor Bridge with proper phasing to supply a constant current to the load. This system cannot be used with a constant speed wire feeder. Therefore, the Risberg system could not be used in ESW or ESW-NG welding process unless it was tied to a variable speed wire feeder. The use of a variable speed voltage following wire feeder is not, however, a satisfactory solution because, as previously mentioned, cold starts are difficult, and any disturbance of the current or voltage would cause the voltage following wire feeder to react and interact with the arc in such a way as to become at least momentarily unstable.

U.S. Pat. No. 4,322,602 to Grist applies a square wave AC power source having constant potential power which can be matched with a constant speed wire feeder in deep groove submerged arc welding applications. The Grist square wave AC power source has a very rapid crossover transition at polarity reversal, and thus the arc does not extinguish each half cycle. As a result, the wire does not need to advance, strike the work-piece, ignite a new arc, and burn back 120 times per second. Grist does not have suitable properties for ESW and ESW-NG welding processes since it is tied to a constant feed wire feeder.

What is needed is a VB/CP/AC Square Wave power source, controlled in a constant voltage mode, FIG. 6, for the ESW and ESW-NG welding processes. This VB/CP/AC Square Wave power supply can be matched with 1) multiple guide tube configurations, 2) multi-pass applications, and/or 3) controllable variable speed wire electrode feeder assemblies, thus gaining the various advantages which have become familiar in DC automatic welding applications, namely, controlling the base metal dilution, the total heat input into the parent material and the reduction or elimination of any DC magnetic field.

DISCLOSURE OF INVENTION

A VB/CP/AC Square Wave welding power supply employed to the ESW and ESW-NG welding processes is hereinafter disclosed. All designs of (VB/CP/AC Square Wave) are capable of being used with the ESW and/or ESW-NG welding process—including, but not limited to, SCR power supplies, IGBT power supplies, constant current power supplies, constant voltage power supplies, and DC power supplies connected "Electrode Positive" (DCEP)—also referred to as DC Reverse Polarity; and connected "Electrode Negative" (DCEN)—also referred to as DC Straight Polarity. Extensive research comparing Narrow Gap Electroslag welding (ESW-NG), using constant voltage DC welding power supplies as opposed with (VB/CP/AC Square Wave) welding power supplies has been compiled and repotted.

Subsequent studies of welds made with Constant Voltage DC power supplies compare the heat generated by DCEP with DCEN. These studies show that welding with DCEP always ran much hotter than welding DCEN. It was further discovered that welding with the DC power supply always created a strong magnetic field that tended to pull the penetration of the weld puddle to one side or the other, depending on the direction of the magnet field.

ESW and ESW-NG welds using a VB/CP/AC Square Wave welding power supply eliminated the magnetic field problem. Associated consumable guide tube assemblies no longer have a strong magnetic pull that tends to deflect the assembly from the center of the weld cavity. When the guide tube is deflected, the weld penetration can be pulled in the direction of the bend. The constant voltage square wave AC welding power supply reduced, or eliminated the magnetic field, and the weld tended to stay in the center, with balanced penetration on all sides of the weld cavity for ESW and/or ESW-NG.

It was discovered that any given amperage and voltage condition (wattage) input to the ESW molten flux, using the VB/CP/AC Square Wave power supply, substantially reduces the total heat input into the parent material. It has been observed that the DCEP half cycle of the AC Square Wave produces higher heat input into the parent material, and the DCEN produces lower heat input into the parent material. Therefore having the ability of setting the time cycle of the of DCEP, as opposed to DCEN allows adjustment of the heat input to the parent material to more closely control the shape of the weld bead, and thus the amount of base metal dilution of the resultant weld puddle. Research and development continue to confirm these conditions.

The ESW and/or ESW-NG with VB/CP/AC Square Wave welding power supply controls the weld bead shape, minimizes the base metal dilution, reduces the total heat input into the parent material, and the reduces or eliminates any magnetic field. This is the first time that a VB/CP/AC Square Wave power supply has been used to produce an ESW and ESW-NG weld. This is extremely important, because constant voltage allows the operator to increase or decrease the voltage to increase or decrease base metal dilution. Control of base metal dilution directly controls the quality of the weld by controlling the total heat input into the parent material and reducing the grain size to produce a higher quality weld.

These and other features, aspects, and advantages of the present invention will become better understood with regard to the following description, appended claims, and accompanying drawings as further described.

BRIEF DESCRIPTION OF DRAWINGS

The following drawing figures are attached to this document.

FIG. 7 is a table of heat input calculations comparing single pass and multi-pass welds for similar heavy plate workpieces ranging from 3 inch to 9 inch plate thickness for an embodiment of ESW-NG using at least one constant voltage square wave AC welding power supply.

DETAILED DESCRIPTION

ESW and/or ESW-NG welds, produced by a welding method or system with VB/CP/AC Square Wave welding power supply, employ superior control to produce better physical weld properties. A variety of Square Wave AC powers supply designs are capable of producing acceptable ESW and/or ESW-NG welds, including, but not limited to, SCR power supplies, IGBT power supplies, constant voltage power supplies, and DC power supplies connected "Electrode Positive" (DCEP)—also referred to as DC Reverse Polarity; and connected "Electrode Negative" (DCEN)—also referred to as DC Straight Polarity. Extensive research comparing Narrow Gap Electroslag welding (ESW-NG), using constant voltage DC welding power supplies as opposed with VB/CP/AC Square Wave welding power supplies has been compiled and reported.

Figure 1:
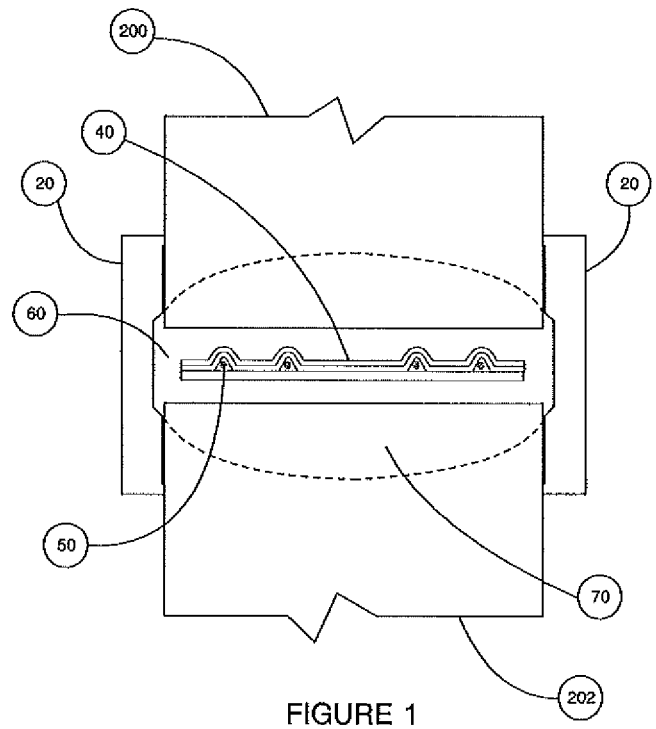
FIG. 1 is a depiction of a typical Electroslag weld shape for an Electroslag welding system having a single wire-feed with multiple weld wires without a constant voltage square wave AC welding power supply.
Figure 5:
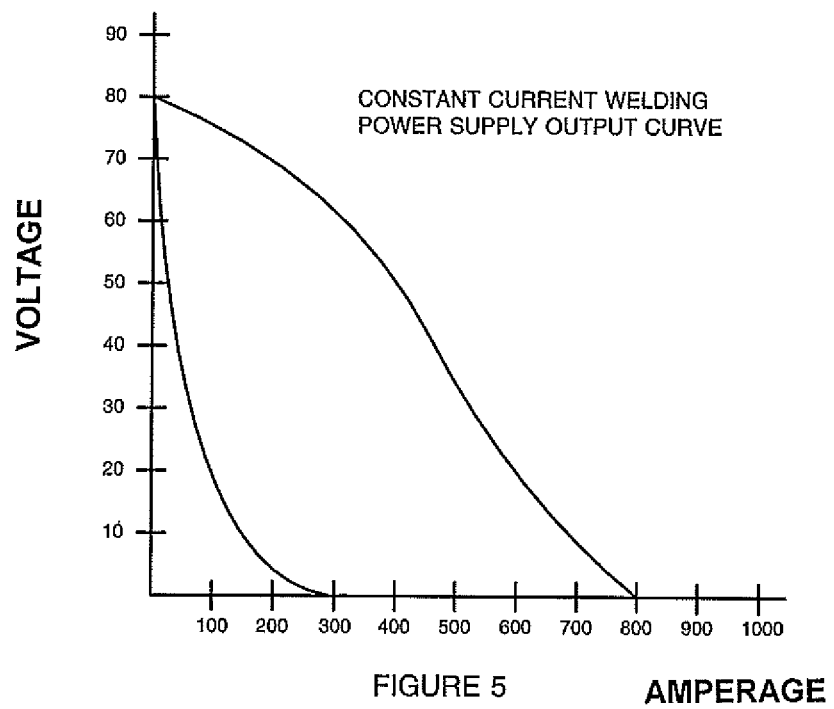
FIG. 5 is a graph depicting voltage versus amperage for a constant current welding power supply output curve.

A typical Electroslag weld shape/penetration into the parent material 70 for an Electroslag welding system having a single wire-feed with multiple weld wires without a VB/CP/AC Square Wave welding power supply is shown in FIG. 1, and the corresponding representative constant current output curve is shown in FIG. 5. As shown in FIG. 1, a single weld cavity 60 between workpieces 200 and 202, and within articulated air-cooled copper shoes 20, receives consumable guide tube 40 with multiple weld wires 50.

Figure 2:
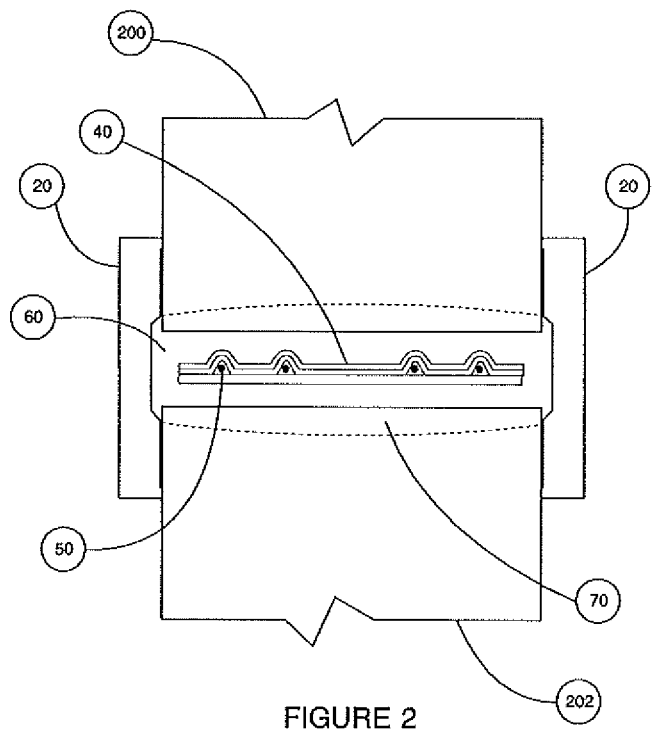
FIG. 2 is a depiction of weld shape from an embodiment of an Electroslag welding system having at least one constant voltage square wave AC welding power supply with multiple wire-feed speeds and multiple weld wires.
Figure 6:
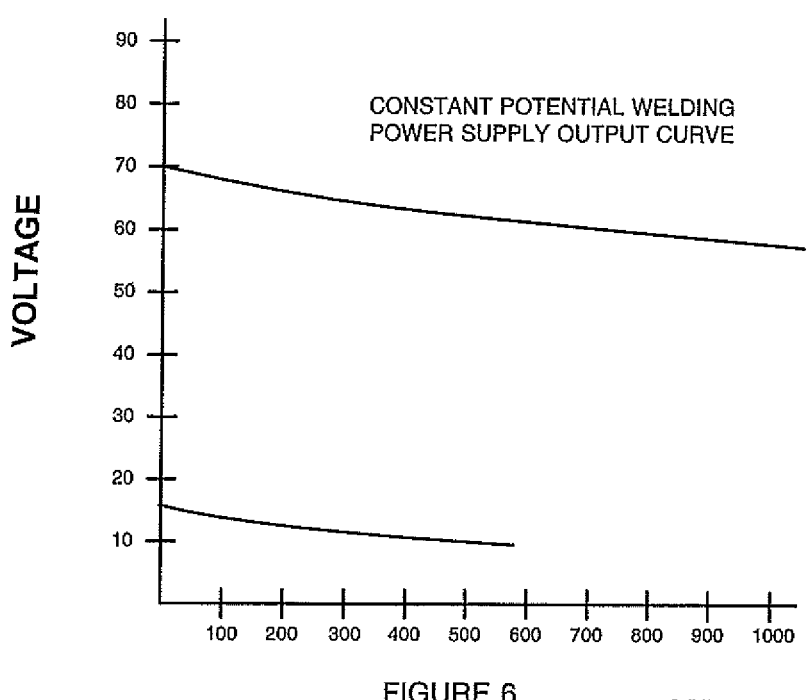
FIG. 6 is a graph depicting voltage versus amperage for a constant potential (square wave) welding power supply output curve.

An embodiment of an Electroslag welding system and method having at least one VB/CP/AC Square Wave welding power supply with multiple wire-feed speeds and multiple weld wires for the same single weld cavity 60 between workpieces 200 and 202, and within articulated air-cooled copper shoes 20, and having a single consumable guide tube 40 with multiple weld wires 50 is shown in FIG. 2, and the corresponding representative constant potential output curve is shown in FIG. 6. The Electroslag weld shape/penetration into the parent material 70 in FIG. 2 is greatly reduced and is more even than the corresponding Electroslag weld shape/penetration into the parent material 70 for FIG. 1. This reduction of penetration into the workpieces, 200 and 202, and even weld shape reduces the amount of base metal dilution in the center of heavy plate ESW weld joints. These reduced metal dilution factors become more advantageous for multiple-pass ESW applications as shown by the data presented in the table of heat input calculations for these welding applications in FIG. 7.

Further, testing shows that the heat input to the molten puddle occurs around the area where the weld wires 50 are fed from the consumable guide tubes 40 into the molten puddle of the weld cavity 60, and that the heat is proportional to the wire feed speed expressed in amperage.

Based on this knowledge, reducing the wire feed lowers the total heat input by lowering the wire speed of the center weld wires 50, and increasing the speed on the outside weld wires 50. The generated heat is greater on the outside where it is needed to compensate for the cooling effect of the articulated air-cooled copper shoes 20. Consequently, the lower wire speed of the center weld wires 50 reduces the heat generated in the center of the weld. The resulting effect forms a much better weld shape/penetration into the parent material 70 and decreases the dilution of the parent material in the weld deposit, therefore, resulting in a higher alloy content deposited by the weld wire 50.

Figure 3:
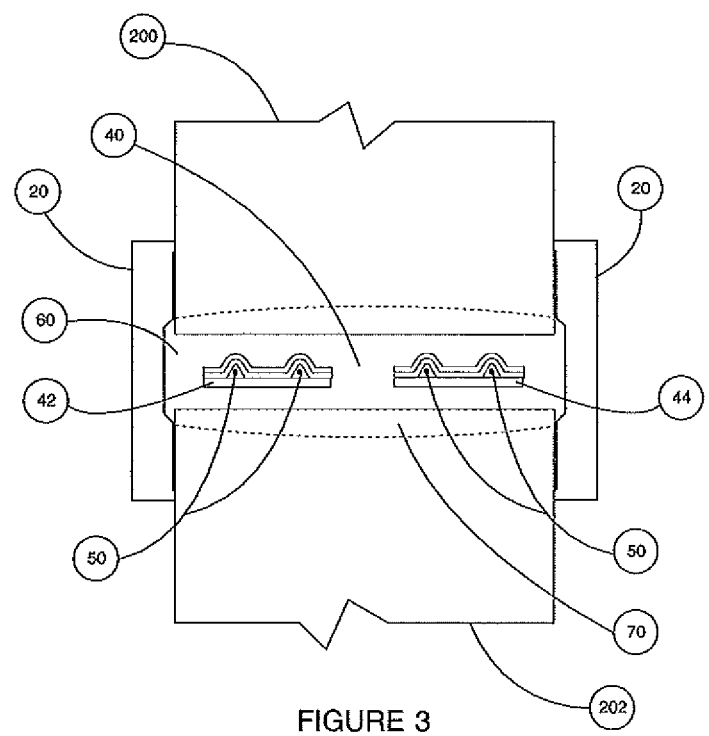
FIG. 3 is a depiction of weld shape from an embodiment of an Electroslag welding system with two constant voltage square wave AC welding power supplies electrically isolated from one another, and multiple wire-feed speeds and multiple weld wires.
Figure 4:
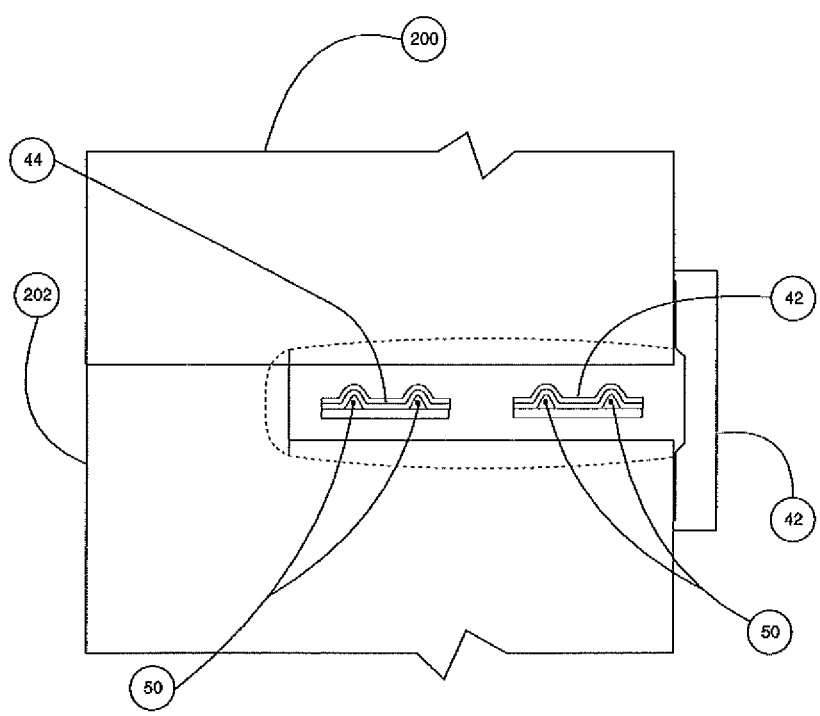
FIG. 4 is a depiction of a partial penetration weld shape from an embodiment of an Electroslag welding system with two constant voltage square wave AC welding power supplies electrically isolated from one another, and multiple wire-feed speeds and multiple weld wires.

Testing has also shown quality control advantages in separating two consumable guide tubes 40 and electrically isolating the two consumable guide tubes 40 from one another, FIGS. 3 and 4. This configuration allows welding with two VB/CP/AC Square Wave welding power supplies. The two VB/CP/AC Square Wave welding power supplies do not have to be paralleled together to weld in the same molten ESW/ESW-NG weld puddle within a single weld cavity 60 between work pieces, 200 and 202, and within air-cooled copper shoes 20.

When two VB/CP/AC Square Wave power supplies are used, a two-wire consumable guide tube 42 can be welding at one potential on the right side of the weld cavity 60 and a two-wire consumable guide tube 44 can be welding at a second potential on the left side of the weld cavity 60, FIG. 3. Welding at different welding potential and at different wire feed speeds is also useful when welding on a "V-Shaped" (partial penetration) weld cavity 60, FIG. 4.

Subsequent studies of welds made with constant voltage DC power supplies compare the heat generated by DCEP with DCEN. These studies show that welding with DCEP always ran much hotter than welding DCEN. It was further discovered that welding with the DC power supply always created a strong magnetic field that tended to pull the penetration of the weld puddle to one side or the other, depending on the direction of the magnet field.

ESW and ESW-NG welds from welding systems or methods using VB/CP/AC Square Wave welding power supplies eliminate the magnetic field problem, particularly in ESW and ESW-NG welding system applications having one or more of the following components or attributes: 1) multiple guide tube configurations (FIGS. 3 and 4); 2) multiple pass welding (FIG. 7); and/or 3) controllable variable speed wire electrode feeder assemblies (FIGS. 2-4).

Associated consumable guide tube 40 assemblies no longer have a strong magnetic pull that tends to deflect the assembly from the center of the weld cavity 60—causing the consumable guide tube 40 to short circuit against the sidewall of the weld cavity 60, causing the weld to stop. When the consumable guide tube 40 is deflected, the weld penetration can be pulled in the direction of the bend. The VB/CP/AC Square Wave welding power supply reduced, or eliminated the magnetic field, and the weld tended to stay in the center, with balanced penetration on all sides of the weld cavity for ESW and/or ESW-NG, reducing or eliminating the potential to short-circuit and stop the process in the middle of the weld cycle.

It has been demonstrated using the invention for ESW and/or ESW-NG welds, produced with a VB/CP/AC Square Wave welding power supply, that any given amperage and voltage condition (wattage) input to the ESW molten flux covering the molten steel welding puddle substantially reduces the total heat input into the parent material. It further has been observed that the DCEP half cycle of the (VB/CP/AC Square Wave) welding power supply produces higher heat input into the parent material, and the DCEN produces lower heat input into the parent material. Thus, setting the time cycle of the DCEP, as opposed to DCEN, allows the operator to adjust the heat input to the parent material. The controlled VB/CP/AC Square Wave power supply for ESW more closely controls the shape of the weld bead. Accordingly, the amount of base metal dilution of the resultant weld puddle is significantly reduced, FIGS. 2 and 3.

An embodiment of the VB/CP/AC Square Wave welding power supply for ESW and/or ESW-NG systems, methods, and/or applications can be pre-programmed into the Arcmatic™ programmable, distributed computer controlled integrated welding system, such as the disclosed invention of my pending U.S. non-provisional patent application Ser. No. 12/621,750 filed Nov. 19, 2009 (the "'750 application"), incorporated by reference as if fully set forth herein.

An embodiment of the welding system and method using at least one VB/CP/AC Square Wave welding power supply for ESW and/or ESW-NG systems, methods, and/or applications includes at least one pair of articulated air cooled copper welding shoes, such as the disclosed invention of my pending U.S. non-provisional patent application Ser. No. 12/475,015 filed May 29, 2009 (the "'015 application"), incorporated by reference as if fully set forth herein.

An embodiment of the VB/CP/AC Square Wave welding power supply for ESW and/or ESW-NG systems, methods, and/or applications includes at least one controllable variable speed wire electrode feeder assembly, such as the disclosed invention of my pending U.S. non-provisional patent application Ser. No. 12/572,945 filed Oct. 2, 2009 (the "'945 application"), incorporated by reference as if fully set forth herein.

Accordingly, as detailed in the foregoing disclosure, the systems, methods, and/or applications of ESW and/or ESW-NG with VB/CP/AC Square Wave welding power supply better control the weld bead shape, minimize the base metal dilution, reduce the total heat input into the parent material, and the reduce or eliminate any magnetic field. The ESW and/or ESW-NG with VB/CP/AC Square Wave welding power supply for the first time uses a constant voltage square wave AC power supply to produce ESW welds and ESW-NG welds, and it enhances the quality of ESW welds and ESW-NG welds including, but not limited to, welding assemblies, systems or methods described in my '750 application, and/or my '015 application, and/or my '945 application.

I claim:

1. A method of Electroslag welding comprising the step of providing at least one variable balance, constant potential, alternating current square wave welding power supply to an Electroslag welding system, whereby 1) control of a weld bead shape within a weld cavity is improved, 2) total heat input to a parent material from the weld cavity is reduced, 3) base metal dilution to the weld cavity is minimized, and 4) any magnetic field in the weld cavity is reduced or eliminated.

2. The method of claim 1, wherein the Electroslag welding system comprises at least one Electroslag narrow-gap welding application.

3. The method of claim 1, further comprising the step of providing at least one pair of articulated, air-cooled copper welding shoes to the Electroslag welding system.

4. The method of claim 1, further comprising the step of providing at least one controllable variable speed wire electrode feeder assembly to the Electroslag welding system.

5. The method of claim 1, further comprising the step of providing at least one programmable, distributed computer controlled integrated system for welding operations of the Electroslag welding system.

6. The method of claim 1, wherein the Electroslag welding system comprises at least one Electroslag multiple pass welding application.

7. A system for Electroslag welding comprising 1) at least one Electroslag welding assembly and 2) at least one variable balance, constant potential, alternating current square wave welding power supply, whereby control of a weld bead shape within a weld cavity is improved, total heat input from the weld cavity to a parent material is reduced, base metal dilution to the weld cavity is minimized, and any magnetic field in the weld cavity is reduced or eliminated.

8. The system of claim 7, wherein the Electroslag welding assembly further comprises at least one Electroslag narrow-gap welding assembly.

9. The system of claim 7, wherein the Electroslag welding assembly further comprises at least one pair of articulated, air-cooled copper welding shoes.

10. The system of claim 7, wherein the Electroslag welding assembly further comprises at least one controllable variable speed wire electrode feeder assembly.

11. The system of claim 7, wherein the Electroslag welding assembly further comprises at least one programmable, distributed computer controlled integrated system for welding operations.

12. The system of claim 7, wherein the Electroslag welding assembly further comprises at least one Electroslag multiple pass welding assembly.

13. A method for welding using an Electroslag welding system, the Electroslag welding system comprising 1) at least one Electroslag welding assembly and 2) at least one variable balance, constant potential, alternating current square wave welding power supply engendering improved control of a weld bead shape in a weld cavity, reduced total heat input from the weld cavity to a parent material, minimal base metal dilution to the weld cavity, and reduced or eliminated magnetic field in the weld cavity.

14. The Electroslag welding method of claim 13, whereby the Electroslag welding system further comprises at least one Electroslag narrow-gap welding assembly.

15. The Electroslag welding method of claim 13, whereby the Electroslag welding system further comprises at least one pair of articulated, air-cooled copper welding shoes.

16. The Electroslag welding method of claim 13, whereby the Electroslag welding system further comprises at least one controllable variable speed wire electrode feeder assembly.

17. The Electroslag welding method of claim 13, whereby the Electroslag welding system further comprises at least one programmable, distributed computer controlled integrated system for welding operations.

18. The Electroslag welding method of claim 13, whereby the Electroslag welding system further comprises at least one Electroslag multi-pass welding assembly.

* * * * *